Oct. 10, 1950   J. SASSANO   2,524,995
COUPLING FOR ROTARY BRUSHES OR OTHER DRIVEN ELEMENTS
Filed June 10, 1948
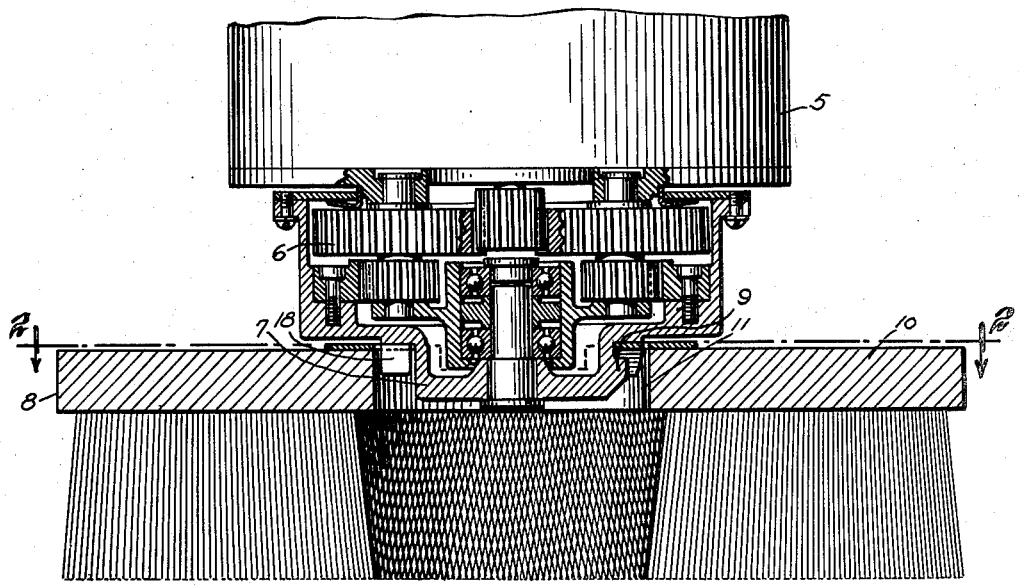
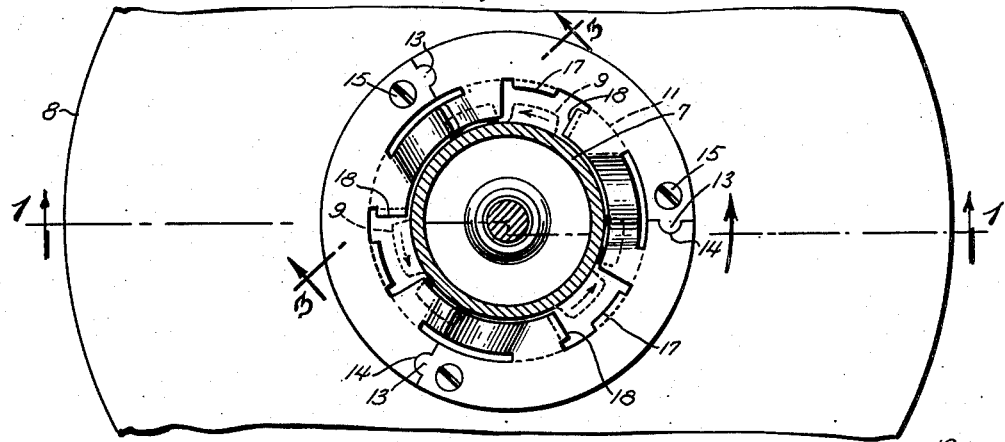
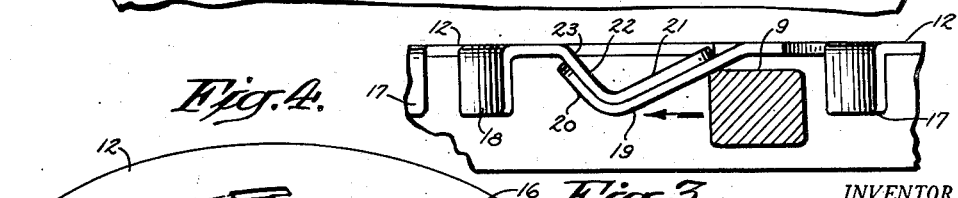
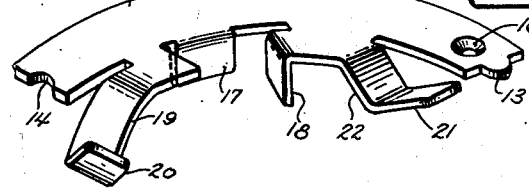
INVENTOR.
JOSEPH SASSANO
BY
Philip S. McBean
ATTORNEY Patented Oct. 10, 1950

2,524,995

UNITED STATES PATENT OFFICE 2,524,995

COUPLING FOR ROTARY BRUSHES OR OTHER DRIVEN ELEMENTS

Joseph Sassano, Yonkers, N. Y.

Application June 10, 1948, Serial No. 32,203

4 Claims. (Cl. 287—103)

The invention herein disclosed relates to devices in the nature of couplings for removably connecting a driven element such as a rotary brush with an electric motor or other means for operating the same.

More particularly the invention has reference to couplings for the brushes, sanders and other operating elements used on power driven floor servicing machines.

Special objects of the invention are to provide a lighter, stronger, less expensive and more practical form of coupling than the heavy, brittle, cast metal couplings heretofore used for the purpose.

Further special objects of the invention are to so design the coupling that it may be made up out of sheet material and further, so that there will be little or no waste in blanking out the sheet material, even for large diameter size couplings.

Other special objects of the invention are to provide a coupling which may be quickly and easily applied to or be removed from the back of the brush or other element with which it is used and which if a portion of it should be injured, may be readily repaired by simple replacement of the injured portion.

Other desirable objects and the novel features of the invention through which the objects are attained are specifically set forth or will appear in the course of the following specification.

The drawing accompanying and forming part of the specification illustrates a present commercial embodiment of the invention. Structure, however, may be modified and changed as regards this particular illustration, all within the true intent and broad scope of the invention as hereinafter defined and claimed.

Fig. 1 in the drawing is a broken and part vertical sectional view of the invention as applied to a power driven floor brush, the sectional portion being taken on substantially the plane of line 1—1 of Fig. 2;

Fig. 2 is a horizontal sectional view on substantially the plane of line 2—2 of Fig. 1;

Fig. 3 is an enlarged fragmentary view as on substantially the plane of line 3—3 of Fig. 2;

Fig. 4 is a detached perspective view of one of the three segments which collectively interlock to constitute the drive collar or coupling.

In the illustration the invention is shown applied to a floor machine made up of a motor 5 operating through reduction gearing 6, a hub 7 coupled to a brush or other floor servicing element 8. The hub 7 is shown as carrying radially projecting driving lugs or tangs 9.

The driven element, which for purposes of disclosure may be herein referred to as a rotary brush, is shown as having a suitable back or base 10 with a central opening 11 for the drive hub.

The coupling is shown in the form of a flat flange or ring made up of three like segments 12 interlocked together in circular formation by a lug 13 on the end of one entered in a corresponding notch 14 in the end of the adjoining segment.

Screws 15 passed through openings 16 at the projecting lug ends of the segments secure the segments firmly in place in interlocked relation on the top of the brush back 10.

Each segment has a lug 17 struck downward in position to fit the inner wall of the opening 11 in the brush back, thus to locate the circular series of segments accurately in centered relation on the brush.

In back of the positioning lugs 17, considering the direction of rotation indicated by arrows, Fig. 2, radially disposed lugs 18 are struck down to afford clearance and back stops for the driving lugs 9.

Forwardly of the positioning lugs 17 each segment carries a downwardly inclined abutment lug 19 for wedging engagement by the drive lugs 9, as indicated in Fig. 3.

These downwardly inclined driven lugs 19 are shown as having upwardly inclined extensions 20 at their forward ends and the two oppositely inclined portions 19 and 20 are shown in Fig. 3 as arranged to underlie and fit the oppositely inclined portions 21, 22, of a rearwardly directed lug 23 of an adjoining segment.

By this construction and arrangement the segments are interlocked so that they cannot pull apart and held vertically so that they cannot get out of horizontal alignment.

This construction also makes it unnecessary to use more than one screw on each segment, since the single screw at the rearward end of each segment holds that segment down with the holddown lug 23 at that end of the segment overlying and pressing downward on the forwardly extended driven lug 19, 20, of the next, following segment. If considered desirable, however, more fastenings may be used, as by provision of screw holes at the forward ends, as well as at the rearward ends of the segments.

While the drive ring has been shown made up of three like segments, it is possible that this ring may be made in less or in greater number of segments. In any event, each segment may be blanked out and formed up without much waste of metal and the interlocking parts at the adjoining ends of the segments are such as to give them the strength and stability of a single-piece continuous ring.

In case of breakage or injury only the defective segment need be replaced.

The structure is light and strong. Additionally, the underlying and overlying inclined wedge lugs at the adjoining ends of the segments reinforce and brace each other and introduce a certain amount of resiliency or flexibility providing the effect of a cushioned drive between the motor and brush. The incline of these driven lugs is such as to provide a firm abutment for the driving lugs 9 and to enable these lugs to wedge the brush back firmly against the end of the drive hub. The inclined sheet metal driven lugs also allow for such compensation as may be necessary for the three driving lugs on the hub to properly accommodate themselves equally to the driving of the brush.

The drive ring being of thin sheet metal, adds practically no height or bulk to the brush back, enabling the brush to fit up closer to the motor and also enabling the brushes to be stored in smaller space. The coupling as a whole, and particularly considering the replaceability of the segments, is less expensive and in reality stronger and having less possibility of breakage than cast metal couplings such as heretofore employed.

What is claimed is:

1. A drive coupling for a brush or other element having a back with a central opening and comprising sheet metal segments applied to said back and having downwardly struck lugs engaging the walls of said opening for centering the segments in respect thereto, said segments having interlocking projections and notches at the adjoining ends of the same and further having downwardly inclined lugs at the adjoining ends of the same arranged in overlapping relation with respect to each other to constitute abutments for engagement by driving lugs.

2. A drive coupling for a brush or other element having a back with a central opening and comprising sheet metal segments applied to said back and having downwardly struck lugs engaging the walls of said opening for centering the segments in respect thereto, said segments having interlocking projections and notches at the adjoining ends of the same and further having downwardly inclined lugs at the adjoining ends of the same arranged in overlapping relation with respect to each other to constitute abutments for engagement by driving lugs, said overlapping lugs having reversely inclined end portions interlocking said lugs in the overlapping relation to tie the segments together in their peripherally aligned relation.

3. A drive coupling for a brush or other element having a back with a central opening and comprising sheet metal segments applied to said back and having downwardly struck lugs engaging the walls of said opening for centering the segments in respect thereto, said segments having interlocking projections and notches at the adjoining ends of the same and further having downwardly inclined lugs at the adjoining ends of the same arranged in overlapping relation with respect to each other to constitute abutments for engagement by driving lugs, said overlapping lugs having reversely inclined end portions interlocking said lugs in the overlapping relation to tie the segments together in their peripherally aligned relation and fastenings for securing the segments to the back and for holding said lugs interlocked in the overlapping relation described.

4. A drive coupling for rotary brushes and the like comprising sheet metal segments of like construction having downwardly struck lugs for centering said segments about an opening in a brush back and having downwardly inclined abutment lugs at adjoining ends, said abutment lugs having V-shaped portions overlapping in the assembled relation of the segments to unite the segments peripherally.

JOSEPH SASSANO.

REFERENCES CITED

The following references are of record in the file of this patent:

UNITED STATES PATENTS

| Number | Name | Date |
|---|---|---|
| 1,332,626 | Henegar | Mar. 2, 1920 |
| 1,103,311 | Atkin | Dec. 28, 1920 |